United States Patent [19]
Kolesar

[11] 3,952,893
[45] Apr. 27, 1976

[54] CAR CRANE

[76] Inventor: Joseph J. Kolesar, 48 Blackford Ave., Yonkers, N.Y. 10704

[22] Filed: Oct. 22, 1974

[21] Appl. No.: 516,898

[52] U.S. Cl. .............................. 214/450; 214/75 H
[51] Int. Cl.² ........................................... B60R 9/00
[58] Field of Search ..................... 214/75 H, 450

[56] References Cited
UNITED STATES PATENTS

| | | | |
|---|---|---|---|
| 2,480,884 | 9/1949 | Scott | 214/75 H |
| 2,565,091 | 8/1951 | Reed | 214/75 H |
| 2,792,951 | 5/1957 | White | 214/75 H |
| 3,215,294 | 11/1965 | Salamin | 214/450 |
| 3,804,263 | 4/1974 | Castonguay | 214/75 H |

Primary Examiner—Robert J. Spar
Assistant Examiner—Ross Weaver
Attorney, Agent, or Firm—Howard I. Podell

[57] ABSTRACT

A crane hoist, attachable to an automobile which raises or lowers loads placed on the top of the automobile. The frame of the crane includes a vertical pipe, fastened to a base plate that clamps inside the car between the bottom of the car between the bottom of the car door and the base of the door frame. The vertical pipe passes through the window opening of the door and is held in vertical orientation between the exterior sides of the car and the interior sides of the closed automobile door. A horizontal swing arm, with a cable hoist attached to the free end, and a pulley secured at the car end, is rotatably fastened to a slotted pipe that fits into a bushing on the top of the vertical pipe. The hoist is raised and lowered by means of a crank handle actuated reel mounted on the vertical pipe.

3 Claims, 1 Drawing Figure

U.S. Patent  April 27, 1976  3,952,893
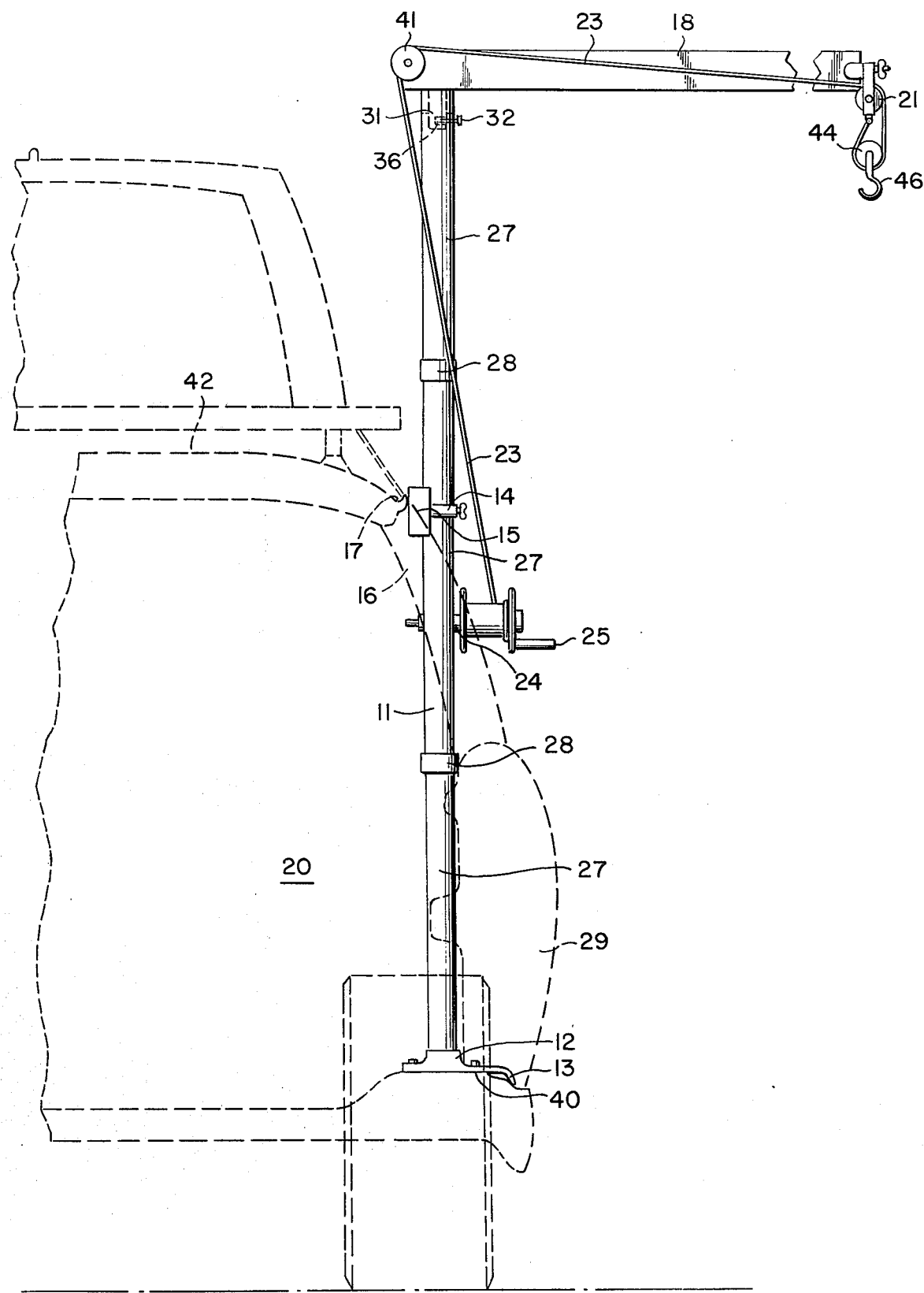

CAR CRANE

SUMMARY OF THE INVENTION

My invention relates to a hoist, and particularly to a crane hoist attachable to a car which raises or lowers loads placed on the car top.

The frame of the crane includes a vertical pipe, fastened to a base plate that clamps inside the car between the bottom of the car door and the base of the door frame.

The vertical pipe passes through the window opening of the door and is held in vertical orientation between the exterior sides of the car and the interior sides of the clsoed automobile door. A horizontal swing arm, with a cable hoist attached to the free end, and a pulley secured at the car end, is rotatably fastened to a slotted pipe that fits into a bushing on the top of the vertical pipe. The hoist is raised and lowered by means of a crank handle actuated reel mounted on the vertical pipe.

BRIEF DESCRIPTION OF THE DRAWING

The objects and features of the invention may be understood with reference to the following detailed description of an illustrative embodiment of the invention, taken together with the accompanying drawings in which:

The FIGURE is a side elevation view of the crane installed.

DESCRIPTION OF THE PREFERRED EMBODIMENT

Turning now descriptively to the drawings, in which similar reference characters denote similar elements throughout the several views, the FIGURE shows the crane 10 installed in a car 20 for use in raising or lowering a load placed on the top 42 of the car 20.

The crane 10 incorporates a vertical member 11 which may be assembled from individual pipe sections 27 fastened together by couplings 28, with the lowermost section 27 joined to a base plate 12. The horizontal arm 18 of the crane 10 is rotatably joined to the top of the uppermost section 17 of the vertical member 11.

One or more brackets 15, fitted with adjustable clamps 14 are fastened about the vertical member 11 to serve as bearing members between the vertical member 11 and the exterior of an automobile to which the device is attached.

A hoisting rig is mounted to the crane 10 comprising a pulley 21, mounted on the free end of horizontal arm 18, a pulley 41 mounted at the other end of arm 18, a hoist cable 23 running over pulleys 21 and 41, and a take - up reel 24 mounted on vertical member 11.

The hoist cable 23 is fastened at its free end about a free pulley 44 and joined to the mounting bracket of arm pulley 21, with a crane hook 46 fastened to free pulley 44.

Take-up reel 24 is operated by a handle 25 and fittted with conventional rachet means to permit rotation of reel 24 in either direction.

Base plate 12 is shaped to hold vertical member 11 upright with a leg 13 of plate 12 fitting between the bottom surface 40 of a door frame of an automobile and the bottom of a closed automobile door 29 in the attached position. The vertical member runs inside the closed door 29 and rises through the open window opening 16 of the door 29, resting against the exterior section 17 of the top of the door 29.

Horizontal arm 18 is fitted with a plug 31 which fits inside the top of vertical member 27 and is fastened in place by a bolt 32 threaded to the vertical member 10 that rides in a horizontal slot in plug 31.

When the crane 10 has served its purpose, it is readily removed from the automobile, by the opening of car door 29, and is disassembled for storage in the trunk of the car 20.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A crane which may be readily attached to or detached from an automobile for the raising or lowering of loads to or from the top of the automobile, comprising a vertical member, a horizontal arm rotatably mounted to the top of the vertical member, a hoisting cable fastened over a pulley attached to the horizontal arm and fastened at one end to a take-up reel mounted on the vertical arm member, said vertical member fitted on its base with means to fasten inside an automobile between the bottom of a door opening of the automobile and the frame of the closed door, with the vertical member mounted inside the automobile along the inside of the door and passing through the open window opening of the said door, such that the vertical member is held in place by its contact with the bottom of the door opening, the top of the inside of the door, and the outside of the top of the door opening.

2. The combination as recited in claim 1 in which the base fastening means comprises a flanged plate fastened to the bottom of the vertical member, said plate shaped to fit between the bottom of a door and the bottom of the door frame with the door closed in the door frame.

3. The combination as recited in claim 1 in which a bracket is detachably clamped to the vertical member, said bracket serving as a bearing member for resting the vertical member against the exterior side of a top section of a side of the automobile.

\* \* \* \* \*